United States Patent
Anderson (10) Patent No.: US 9,832,605 B1
(45) Date of Patent: *Nov. 28, 2017

(54) LOCATION BASED SERVICES FOR EXIGENT CIRCUMSTANCES

(71) Applicant: Securus Technologies, Inc., Dallas, TX (US)

(72) Inventor: Mathew D. Anderson, Coral Springs, FL (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,677

(22) Filed: Jan. 19, 2017

Related U.S. Application Data (63) Continuation of application No. 14/134,094, filed on Dec. 19, 2013, now Pat. No. 9,565,527.

(51) Int. Cl.
*H04W 24/00* (2009.01)
*H04W 4/02* (2009.01)
*H04W 64/00* (2009.01)

(52) U.S. Cl.
CPC .......... *H04W 4/02* (2013.01); *H04W 64/003* (2013.01)

(58) Field of Classification Search
CPC .............................. H04W 4/02; H04W 64/003
See application file for complete search history.

(56) References Cited

U.S. PATENT DOCUMENTS

| 7,949,347 | B1* | 5/2011 | Copeland | H04M 1/725 455/404.2 |
|---|---|---|---|---|
| 8,145,234 | B1 | 3/2012 | Leonard et al. | |
| 8,942,676 | B2 | 1/2015 | Dalton et al. | |
| 8,971,932 | B2* | 3/2015 | Mapes | H04W 4/02 340/539.13 |
| 2002/0156646 | A1 | 10/2002 | Kaiwa et al. | |
| 2003/0109265 | A1 | 6/2003 | Yamamoto et al. | |
| 2004/0203900 | A1 | 10/2004 | Cedervall et al. | |
| 2008/0280609 | A1* | 11/2008 | Imbimbo | H04M 3/2281 455/435.1 |
| 2010/0262367 | A1* | 10/2010 | Riggins | G06Q 10/10 701/533 |
| 2012/0190386 | A1* | 7/2012 | Anderson | G01C 15/04 455/456.3 |

(Continued)

*Primary Examiner* — Ajit Patel
(74) *Attorney, Agent, or Firm* — Fogarty LLP (57) ABSTRACT

Systems and methods for developing, deploying, providing, and/or operating location-based services are disclosed. A computer system receives a search request for location information associated with a wireless device. The search request is received from a requesting party, such as an investigator or law enforcement officer. The search request includes an indication of exigent circumstances. A service provider associated with the wireless device is identified. A notification message is generated comprising information associated with the search request. The notification message is provided to at least one notification party, who is other than the requesting party. When approval is received from the notification party, location information is obtained from the service provider. The location information may be provided to the notification party. When approval is received from the notification party, the location information is provided to the requesting party.

20 Claims, 4 Drawing Sheets

(56) References Cited

U.S. PATENT DOCUMENTS

| | | |
|---|---|---|
| 2012/0295638 A1 | 11/2012 | Yamauchi |
| 2013/0217333 A1* | 8/2013 | Sprigg ................. H04W 4/008 455/41.2 |
| 2014/0162684 A1* | 6/2014 | Shaw ..................... H04W 4/02 455/456.1 |
| 2014/0248872 A1 | 9/2014 | Sun et al. |
| 2015/0017945 A1 | 1/2015 | Eckler |

* cited by examiner

LOCATION BASED SERVICES FOR EXIGENT CIRCUMSTANCES

BACKGROUND

Wireless telephones are widely used across all socioeconomic groups in the United States. Most adults and teens, and many children, have their own wireless devices that they use for telephone calls, email, Internet access, etc. As a result, an increasing number of households are becoming "wireless-only" as homeowners see their traditional wired telephone service as redundant and/or unused.

The increasing use of wireless devices for voice and other communications can present a problem for the law enforcement community because wireless telephone numbers cannot be easily matched to a physical address as was traditionally possible with wired or landline telephone numbers. The FCC's local number portability (LNP) rules allow users to switch telephone service providers and keep their existing telephone number. This can make it difficult to identify the current service provider for a particular wireless device using just the telephone number. The telephone number being used by a wireless device may have been ported among two or more different carriers since it was first assigned. Accordingly, in order to obtain call and billing records for a wireless device that is relevant to an investigation, law enforcement must first identify the relevant service provider. Then, an investigator must obtain the proper warrant to request the records from the service provider.

After call and billing records for a telephone number of interest are obtained, the investigator may only have a billing address for the wireless device. Unlike traditional landline telephones, the wireless device may be used to make telephone calls from any location across the country or the world. So the billing address is not necessarily helpful in identifying the current location of the wireless device. Detailed call records from a service provider may indicate locations for past telephone calls, such as by identifying a cellular network tower that supported a particular call. However, such historical location information is of limited use because the wireless device user has likely moved from the location of those past calls.

SUMMARY

Embodiments disclosed herein are directed to systems and methods for developing, deploying, providing, and/or operating location-based services to identify the location of a wireless device.

In one embodiment, a search request is received at a location-based search service. The search request identifies a wireless device and includes an indication that the search request is associated with exigent circumstances is received. The exigent circumstances may include, for example, a search for a missing child, a search for a missing elderly person, or a public threat. A service provider associated with the wireless device is identified. The service provider may be identified using a database of known service providers and associated telephone numbers, or service providers may be queried regarding specific telephone numbers.

A notification message is generated. The notification message comprises information associated with the search request, such as the requesting party's identity, device telephone number, device identifier, exigent circumstances type, exigent circumstances details (e.g., missing person's name, threat type, time of exigent circumstances event, service provider identity, etc.). The notification message is provided to a notification party. The notification party may be any one or more individuals who are to be notified when a warrantless or exigent circumstances location search is requested. This may include, for example, a supervisor of the requesting party, a system or application administrator, other users currently logged-on to the location search application, a review board, etc.

The notification party may approve or deny the search request. Explicit approval may be required in some embodiments. In other embodiments, if no objection is received for a predetermined interval, then approval may be assumed. If the notification party denies the search request, then the search ends.

If the search is approved by the notification party, then the location information is obtained from the service provider. The location information may be obtained directly from the service provider or from a third-party location database or application. In other embodiments, location information for a particular device or user is sought from all service providers or from a group of service provides. For example, rather than limiting the search to a particular service provider, the search may be conducted across a group of service providers to collect location information for devices that are roaming outside of its home network.

The search results are provided to the notification party. The notification party may approve or deny the search results. If the notification party denies the search request, then the search ends. If the search results are approved for distribution, then the search results, including the location information, is provided to the requesting party.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description.

DETAILED DESCRIPTION

This specification discloses systems and methods for developing, deploying, providing, and/or operating location-based services. Generally speaking, the various techniques described herein may find applicability in a wide variety of law enforcement operations, such as investigating criminal activity, locating persons of interest, identifying communications and connections between various individuals, etc.

A location-based services (LBS) system allows law enforcement to identify a current location of a particular wireless device. The wireless device may be identified using its assigned telephone number. In other embodiments, the wireless device may be identified using an electronic serial number (ESN), mobile equipment identifier (MEID), user identity module identifier (UIMID), expanded UIMID (EUIMID), international mobile subscriber identity (IMSI), Media Access Control (MAC) address, or other device identifier. A user, such as an investigator, provides the wireless device identifier to the LBS system, which then searches service provider databases to locate records for the wireless device. Once a service provider has been identified, location information for the wireless device may be requested. The location information may be formatted as latitude and longitude coordinates, a GPS location, a United States National Grid (USNG) spatial address, Universal Transverse Mercator Coordinate (UTM) coordinates, or other any other location data.

Using the location information, the investigator may map the wireless device location to a particular physical location or street address. Additionally, the location information may be used to track the wireless device over time to determine a direction, route, or means of travel. The wireless device's location may be compared to other locations to determine whether the wireless device is in an approved or restricted area. For example, the wireless device's location may be compared to areas that are defined by a geofence, street address, or political unit (e.g., a municipality, city, town, state, etc.).

Figure 1:
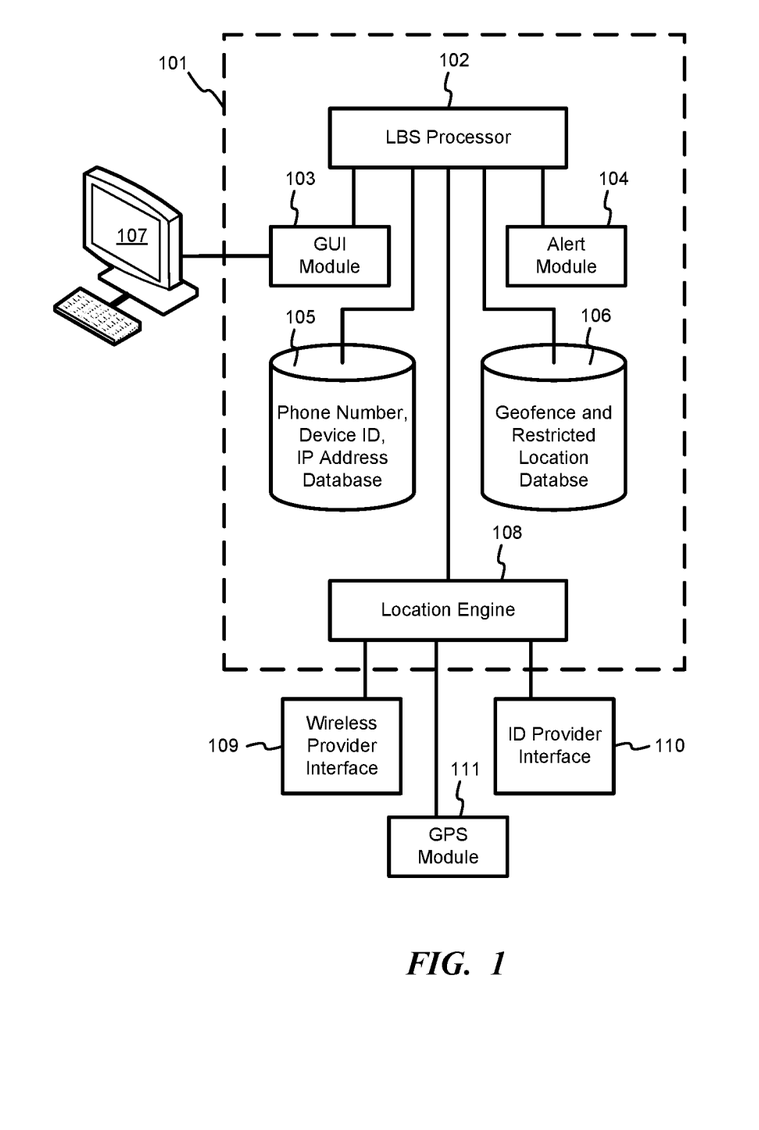
FIG. 1 is a block diagram of a system for providing location-based services (LBS) according to one embodiment.

FIG. 1 is a block diagram of a system 101 for providing location-based services (LBS) according to one embodiment. LBS system 101 includes LBS processor 102 that is operably coupled to Graphical User Interface (GUI) module 103, alert module 104, phone number, device ID, and/or IP address database 105, and geo-fencing database 106. In operation, LBS system 101 may receive requests from users, such as an investigator at terminal 107, via GUI module 103. For instance, LBS processor 102 may receive a location request for a selected device. LBS processor 102 then accesses database 105 to determine whether the selected device is a wireless device and/or whether that device has been subject to location tracking. GUI module 103 may allow one or more users to interact with LBS system 101 in order to access databases 105 and/or 106, manage registered devices and/or authorizations, create or modify geo-fencing rules, view alerts, etc. For example, geofence and restricted location database 106 may include one or more rules that, if violated (e.g., the selected device is outside an allowed geographic area and/or within a forbidden area), causes alert module 104 to generate and/or transmit an alert (e.g., by telephone call, voicemail, email, text message, social network posting, etc.) to one or more selected persons (e.g., investigator, law enforcement personnel, etc.).

LBS processor 102 is coupled to location engine 108, which is operably coupled to cellular provider interface 109, IP provider interface 110, and GPS module 111. In operation, location engine 108 may receive an instruction, message, or command from LBS processor 102 requesting the physical location of a selected device. If the selected device is being served by a wireless carrier, then wireless provider interface 109 may be used to query the wireless carrier for information about the device (e.g., cell ID, sector ID, GPS coordinates, etc.). Conversely, if the device is being served by Internet Service Provider (ISP) (e.g., receiving service over a wired or wireless Internet connection), then IP provider interface 110 may be used to query the ISP for information about the device (e.g., IP address, etc.).

In some embodiments, the location engine 108 may be capable of communicating with the selected device. In this scenario, a GPS module 111 in the selected device may provide the device's location (e.g., GPS coordinates, latitude and longitude, etc.).

When receiving location information directly from a wireless service provider and/or ISP, location engine 108 may identify a range of accuracy or a margin of uncertainty based, for example, on carrier type and available information. For instance, tier 1 cellular networks may provide an exact latitude and longitude that is accurate to within a couple meters. On the other hand, non-tier 1 networks may have an accuracy only to within ~2 miles (e.g., if the technology is based on three closest cell towers or the like).

Upon retrieving physical location information through one or more of modules 109-111, location engine 108 responds to the original request and transmits the device's location information to LBS processor 102.

In some embodiments, the modules or blocks shown in FIG. 1 may represent processing circuitry and/or sets of software routines, logic functions, and/or data structures that, when executed by a processor, perform specified operations. Although these modules are shown as distinct logical blocks, in other embodiments at least some of the operations performed by these modules may be combined into fewer blocks. For example, in some cases, database 105 may be combined with database 106. Conversely, any given one of modules 102-106 and 108-111 may be implemented such that the modules operations are divided among two or more logical blocks. Although shown with a particular configuration, in other embodiments these various modules or blocks may be rearranged in other suitable ways.

In various embodiments, the system shown in FIG. 1 may be used to provide location-based services. For example, using location information for wireless, portable, or mobile devices, LBS system 101 may store and trigger alert events based on the device's physical or geographic location (e.g., latitude/longitude, carrier, cell sector, tower triangulation, Global Positioning System (GPS) coordinates, IP address information, etc.). The physical location information may be used, for example, for law enforcement or correctional facility security purposes. For instance, LBS system 101 may be configured to confirm that a telephone number is associated with a wireless phone or other portable device, provide the identification of the carrier providing service to the mobile device, provide the billing name and address (BNA) registered to the device, determine current and/or past locations of the device, and identify an IP address for the mobile device.

Figure 2:
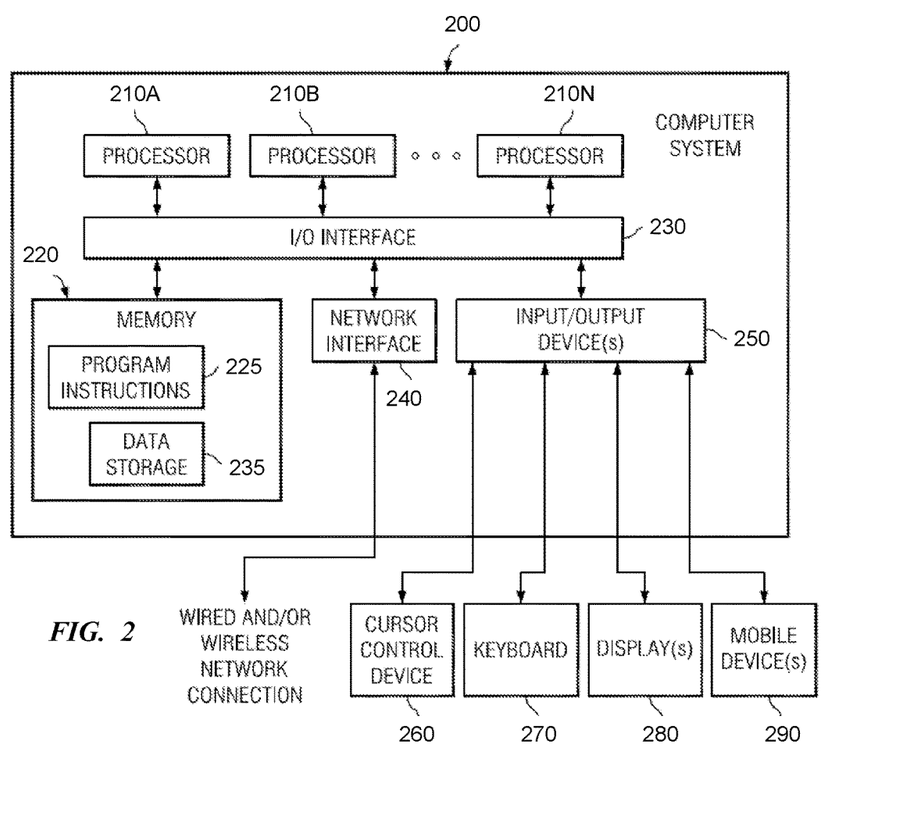
FIG. 2 is a block diagram of a system for providing location-based services.

As noted above, embodiments of systems and methods for developing, deploying, providing, and/or operating location-based services may be implemented or executed by one or more computer systems. One such system is illustrated in FIG. 2. In various embodiments, system 200 may be a server, a workstation, a desktop computer, a laptop, a tablet computer, a mobile device, a smart phone, or the like. In some cases, system 200 may be used to implement LBS system 101, location processor 102, or location engine 108. Additionally or alternatively, devices 101, 102, and 108 may be implemented as integrated components of computer system 200 (e.g., as part of a tablet computing device or the like).

As illustrated, computer system 200 includes one or more processors 210A-N coupled to a system memory 220 via an input/output (I/O) interface 230. Computer system 200 further includes a network interface 240 coupled to I/O interface 230, and one or more input/output devices 250, such as cursor control device 260, keyboard 270, display(s) 280, or mobile device(s) 290. Other devices may include, for example, surveillance cameras, microphones, antennas/wireless transducers, phone detection modules, etc.

In various embodiments, computer system 200 may be a single-processor system including one processor 210, or a multi-processor system including two or more processors 210 (e.g., two, four, eight, or another suitable number). Processors 210 may be any processor capable of executing program instructions. For example, in various embodiments, processors 210 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 210 may commonly, but not necessarily, implement the same ISA. Also, in some embodiments, at least one processor 210 may be a graphics processing unit (GPU) or other dedicated graphics-rendering device.

System memory 220 may be configured to store program instructions and/or data accessible by processor 210. In various embodiments, system memory 220 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, the location-based services described herein, may be stored within system memory 220 as program instructions 225 and data storage 235, respectively. In other embodiments, program instructions and/or data may be received, sent or stored upon different types of computer-accessible media or on similar media separate from system memory 220 or computer system 200. Generally speaking, a computer-accessible medium may include any tangible storage media or memory media such as electronic, magnetic, or optical media—e.g., disk or CD/DVD-ROM coupled to computer system 200 via I/O interface 230. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 230 may be configured to coordinate I/O traffic between processor 210, system memory 220, and any peripheral devices in the device, including network interface 220 or other peripheral interfaces, such as input/output devices 250. In some embodiments, I/O interface 230 may perform any necessary protocol, timing or other data format suitable for use by another component (e.g., processor 210). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. In addition, in some embodiments some or all of the functionality of I/O interface 230, such as an interface to system memory 220, may be incorporated directly into processor 210.

Network interface 240 may be configured to allow data to be exchanged between computer system 200 and other devices attached to a network, such as other computer systems, or between nodes of computer system 200. In various embodiments, network interface 240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 250 may, in some embodiments, include one or more display terminals, keyboards, keypads, touchpads, scanning devices, voice or optical recognition devices, mobile devices, or any other devices suitable for entering or retrieving data by one or more computer system 200. Multiple input/output devices 250 may be present in computer system 200 or may be distributed on various nodes of computer system 200. In some embodiments, similar input/output devices may be separate from computer system 200 and may interact with one or more nodes of computer system 200 through a wired or wireless connection, such as over network interface 240.

As shown in FIG. 2, system memory 220 may include program instructions 225, configured to implement certain embodiments described herein, and data storage 235, comprising various data may be accessible by program instructions 225. In an embodiment, program instructions 225 may include software elements of embodiments illustrated in the above figures. For example, program instructions 225 may be implemented in various embodiments using any desired programming language, scripting language, or combination of programming languages and/or scripting languages (e.g., C, C++, C#, Java™ JavaScript™, Perl, etc.). Data storage 235 may include data that may be used in these embodiments (e.g., recorded communications, profiles for different modes of operations, etc.). In other embodiments, other or different software elements and data may be included.

A person of ordinary skill in the art will appreciate that computer system 200 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 3:
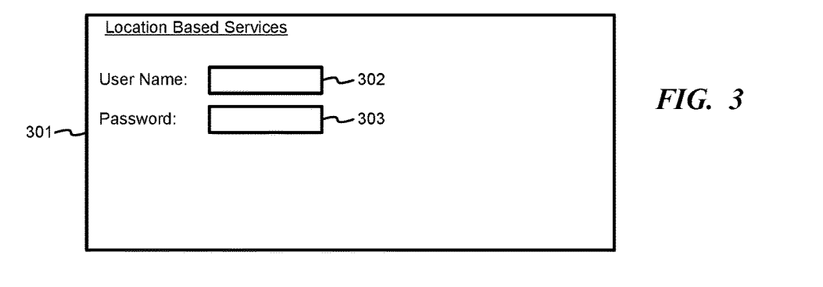
FIG. 3 is an example log-in screen for a location-based services application according to one embodiment.

FIG. 3 is an example of log-in screen 301 for a location-based services application according to one embodiment. A user may access the application via a terminal 107 (FIG. 1), for example. The user provides a user name 302 and password 303 as is well known for accessing software applications. The user name and password may be used to restrict access to the location-based services application to certain individuals, such as authorized investigators, correctional officers and administrators, child protective safety officers, and law enforcement personnel including but not limited to local, federal and state.

Figure 4:
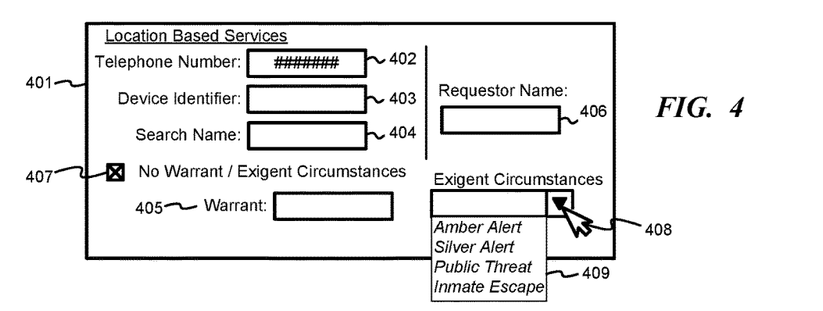
FIG. 4 is an example location-request screen for a location-based services application according to one embodiment

FIG. 4 is an example of location-request screen 401 for a location-based services application according to one embodiment. The user may enter the telephone number 402 or other device identifier 403 (e.g., ESN, MEID, UIMID, EUIMID, IMSI, MAC address, IP address, etc.) for a device of interest. Alternatively, the user may enter a name to search 404, such as the device owner's name, account holder's name, billing name, or other name that may be associated with the wireless telephone or device. The collection, distribution, and use of wireless device location information without the device-owner's permission often raises privacy issues and may require a warrant to obtain such information from a service provider. The user may be required to enter a warrant identifier 405 in order to access location information using the application. The user may be required to enter his or her name in requestor name field 406.

If the user does not have a warrant, then the location information may still be obtained in some cases if there are exigent circumstances. For example, if the user is seeking information about a device that belongs to a suspect or other person under investigation, then the user will likely need to obtain a warrant before accessing such information in order to comply with constitutional privacy rights. However, if the location information is required for public safety reasons, then a warrant might not be required. It takes time to prepare a warrant request, present the request to a judge, and obtain a ruling issuing the warrant. That time is wasted for situations in which the constitutional protections offered by a warrant do not apply. For example, if the location information is needed to search for a missing child (i.e., Amber Alert) or missing elderly person (i.e., Silver Alert) or to react to an immediate terroristic threat or public safety issue (i.e., Public Threat), or Inmate Escape then the user should not be delayed by the warrant process.

In these situations, the user may select a "no warrant" or "exigent circumstances" option 407 in place of entering the warrant identifier 405. When the "no warrant" or "exigent circumstances" option 407 is selected, the user may need to identify the exigent circumstances. In one embodiment, the user may select a drop-down menu using a cursor 408 (e.g., controlled by a mouse or other pointing device) to display a list of acceptable circumstances 409. The user then selects the appropriate exigent circumstance 409 that applies to the situation. The user may be required to provide additional information, such as the name of the missing child/senior/escapee in an Amber/Silver Alert or a case number or investigator name for a Public Threat situation. The telephone number 402, device identifier 403, or name 404 provided in the exigent circumstances search request may be associated with a wireless device belonging to a missing child or senior, a known or suspected abductor, a person making a threat, an escapee, or other relevant individual.

Figure 5:
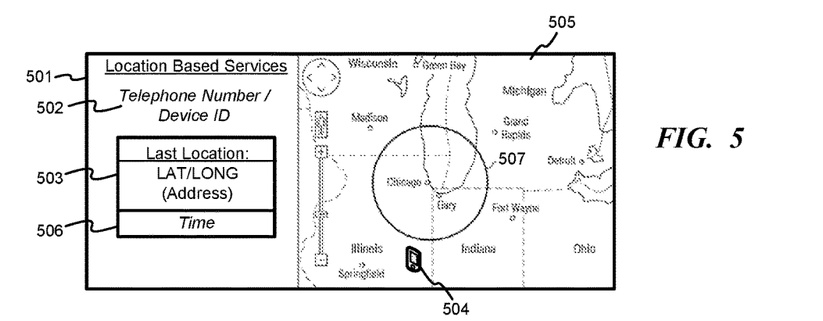
FIG. 5 is an example location information screen for a location-based services application according to one embodiment.

FIG. 5 is an example of a location information screen 501 for a location-based services application according to one embodiment. Once the user has provided the appropriate device identification and warrant/exigent circumstances information, the location-based services application will attempt to obtain location information for that device. That location information may be displayed as text that identifies the device 502 and provides a last location 503, such as a street address, latitude/longitude, GPS coordinates, etc. Additionally or alternatively, the location information may be displayed as a mark 504 on a map 505. The mark 504 may be any icon, symbol, flag, etc. The location information may be associated with a particular time 506.

In other embodiments, historical location information may be provided, such as a list of locations and times and/or a series of locations may be marked on map 505. This historical information identifies movement by the wireless device, if any, and may be used to estimate a future route, location, or destination for the wireless device.

The map 505 may also display a geofenced area 507 or other geographical or political boundaries. The geofenced area 507 may be used to define a search area, a restricted area, a user's jurisdiction, or the like. Map 505 may be a street map, satellite view, hybrid display, or any appropriate or helpful display for the search results.

Figure 6:
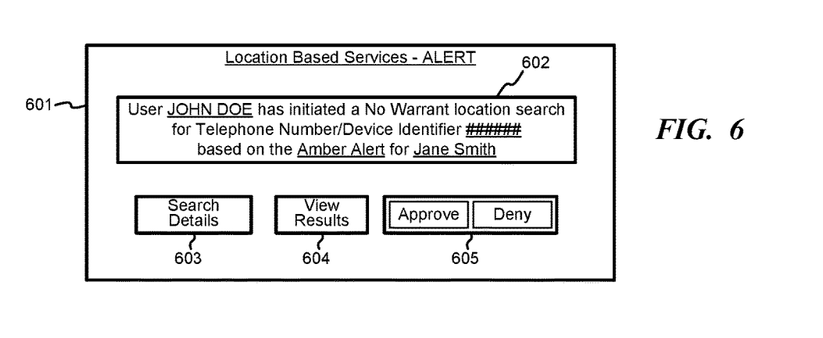
FIG. 6 illustrates an example notification or alert that may be triggered when a user initiates an exigent circumstances location search.

FIG. 6 illustrates an example notification or alert 601 that may be triggered when a user initiates an exigent circumstances location search. Notification 601 includes message 602, which provides details about the exigent circumstances location search. Such a notification or alert may be incorporated into the location-based services application to discourage improper location searches. For example, to prevent users from conducting warrantless searches during an investigation or running location searches on their friends, family, or other acquaintances, the location-based services application generates notification 601 and sends it to other individuals to notify them of the user's exigent circumstances location search. These individuals may include, for example, supervisors, administrators, co-workers, an oversight or review board, etc. In one embodiment, everyone who is logged-on the location-based service application or the system running the application is notified the exigent circumstances search request. If a user knows that someone else will be notified of and/or review an exigent circumstances location search, then the user is less likely to misuse the system to circumvent obtaining a warrant when it is required.

Notification 601 may be generated for every exigent circumstance location search. Alternatively, notification 601 may be generated for selected types of exigent circumstances, generated for random location searches, generated for only select individuals, etc. Notification 601 may be sent to the same group of recipients each time it is generated. Alternatively, the recipient group may be vary for each search and may be selected based upon the exigent circumstances type, initiating user identity, initiating organization, time of day of search, or other criteria.

The recipient of notification 601 may review additional details of the exigent circumstances location search by selecting (e.g., "clicking on") option 603. The recipient may also review the results of the search by selecting option 604. Options 605 may be included to allow the notified party to approve or deny the search when it is requested. If approval is not given, then the search will not be conducted. In some embodiments, the recipient may be required to review the results and then approve the search before the results are forwarded to the initiating user. In this scenario, the initiating user does not see the search results unless the reviewing party has approved them. Such approval may be based upon, for example, the appropriateness of the search request, the relevance of the results, or other criteria.

Figure 7:
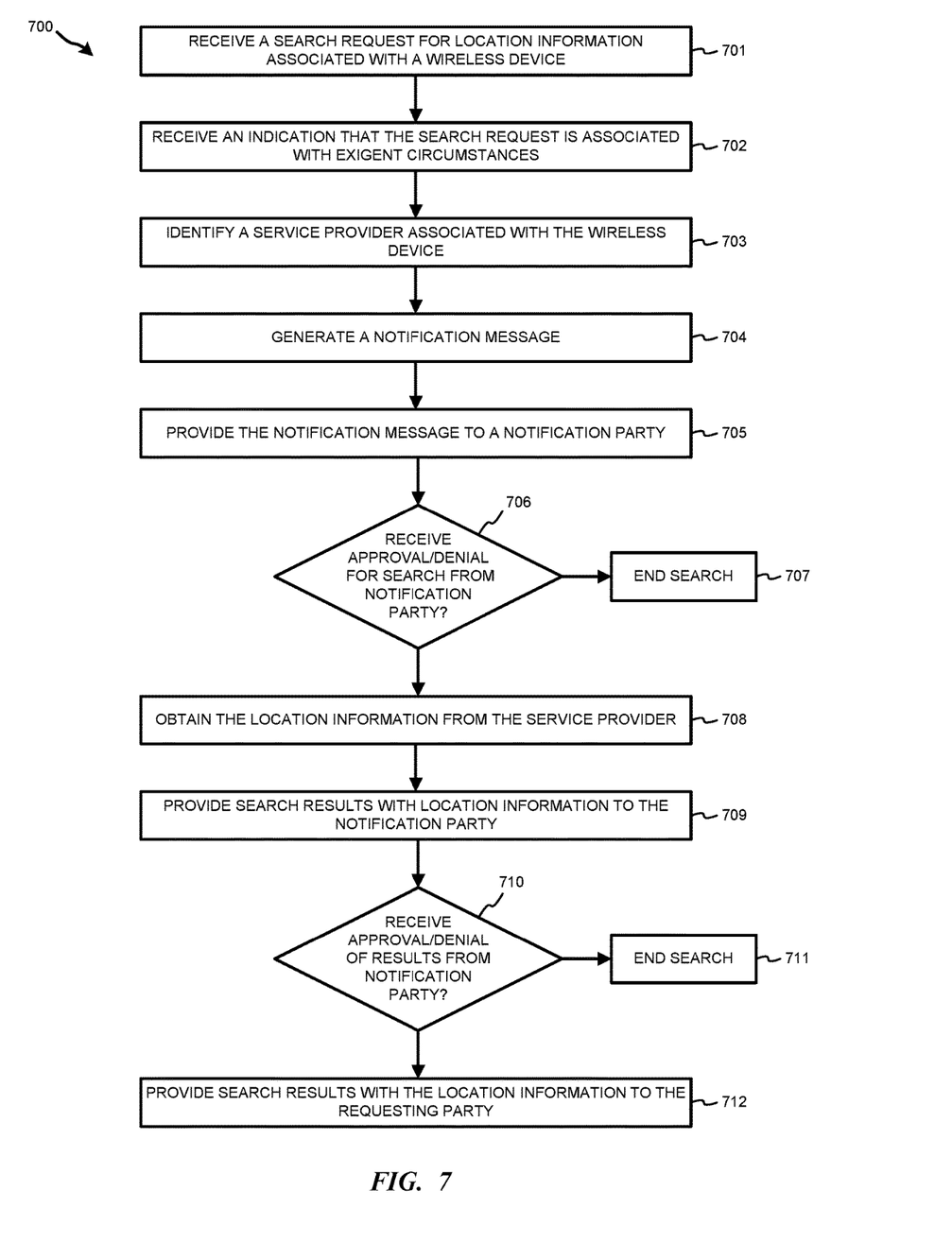
FIG. 7 is a flowchart of an example method for obtaining location information for a wireless device in exigent circumstances.

FIG. 7 is a flowchart of an example of a method 700 of obtaining location information for a wireless device in exigent circumstance. In some embodiments, method 700 may be performed, at least in part, by LBS system 101 of FIG. 1. In step 701, a search request is received. The request is for location information associated with a wireless device. The search request is received from a requesting party. In step 702, an indication that the search request is associated with exigent circumstances is received. The exigent circumstances comprise a search for a missing child, a search for a missing elderly person, or a public threat.

In step 703, a service provider associated with the wireless device is identified. The service provider may be identified using a database of known service providers and associated telephone numbers, or service providers may be queried regarding specific telephone numbers.

In step 704, a notification message is generated. The notification message comprises information associated with the search request, such as the requesting party's identity, device telephone number, device identifier, exigent circumstances type, exigent circumstances details (e.g., missing person's name, threat type, time of exigent circumstances event, service provider identity, etc.). The notification message is provided to a notification party in step 705. The notification party may be any one or more individuals who are to be notified when a warrantless or exigent circumstances location search is requested. This may include, for example, a supervisor of the requesting party, a system or application administrator, other users currently logged-on to the location search application, a review board, etc.

In step 706, the notification party's approval or denial of the search request is evaluated. Explicit approval may be required in some embodiments. In other embodiments, if no objection is received for a predetermined interval, then approval may be assumed. If the notification party denies the search request, then the search ends in step 707.

If the search is approved by the notification party, then the location information is obtained from the service provider in step 708. The location information may be obtained directly from the service provider or from a third-party location database or application. In other embodiments, location information for a particular device or user is sought from all service providers or from a group of service provides. For example, rather than limiting the search to a particular service provider, the search may be conducted across a group of service providers to collect location information for devices that are roaming outside of its home network.

In step 709, the search results are provided to the notification party. In step 710, the notification party's approval or denial of the search results is evaluated. Explicit approval may be required in some embodiments. In other embodiments, if no objection is received for a predetermined interval, then approval may be assumed. If the notification party denies the search request, then the search ends in step 711.

If the search results are approved for distribution in step 710, then the search results, including the location information, is provided to the requesting party in step 712.

The various systems and methods illustrated in the figures and described herein represent example embodiments of systems and methods for location-based services for controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method comprising: receiving a search request for a location of a wireless device, the search request received from a requesting party and the wireless device identified by a unique identifier; determining when the search request is authorized by a search warrant;
   when no search warrant has been provided, receiving user input specifying an exigent circumstance basis for a warrantless search;
   providing a notification message to at least one notification party, wherein the notification message comprises information describing the warrantless search, and further comprises the exigent circumstances specified by the user input;
   determining a service provider that provides wireless service to the wireless device, wherein the service provider is determined based on the unique identifier that identifies the wireless device; obtaining the location of the wireless device from the service provider; and
   when authorized by the notification party, providing the location of the wireless device to the requesting party.

2. The method of claim 1, further comprising:
   providing the obtained location of the wireless device to the at least one notification party.

3. The method of claim 1, wherein the exigent circumstances comprise at least one of: a missing person, an escapee, and a public threat.

4. The method of claim 1, further comprising:
   mapping the location of the wireless device to a street address.

5. The method of claim 1, further comprising:
   tracking the location of the wireless device over a time interval.

6. The method of claim 5, further comprising:
   determining, based on the tracked location of the wireless device, whether the wireless device moves out of a specified geographic area during the tracked time interval.

7. The method of claim 5, further comprising:
   determining, based on the tracked location of the wireless device, whether the wireless device moves into a specified geographic area during the tracked time interval.

8. The method of claim 6, further comprising:
   generating an alert, when the wireless device moves out of the specified geographic area during the tracked time interval.

9. The method of claim 4, further comprising:
   displaying the mapped street address on a graphical user interface.

10. A system, comprising: at least one processor; and a memory coupled to the at least one processor, the memory configured to store program instructions executable by the at least one processor to cause the system to:

receive a search request for a location of a wireless device, the search request received from a requesting party and the wireless device identified by a unique identifier;

determine when the search request is authorized by a search warrant;

when no search warrant has been provided, receive user input specifying an exigent circumstance basis for a warrantless search;

provide a notification message to at least one notification party, wherein the notification message comprises information describing the warrantless search, and further comprises the exigent circumstances specified by the user input;

determine a service provider that provides wireless service to the wireless device, wherein the service provider is determined based on the unique identifier that identifies the wireless device; obtain the location of the wireless device from the service provider; and when authorized by the notification party, provide the location of the wireless device to the requesting party.

11. The system of claim 10, the program instructions further executable by the at least one processor to cause the system to:

provide the obtained location of the wireless device to the at least one notification party.

12. The system of claim 10, wherein the exigent circumstances comprise at least one of: a missing person, an escapee, and a public threat.

13. The system of claim 10, the program instructions further executable by the at least one processor to cause the system to:

map the location of the wireless device to a street address.

14. The system of claim 10, the program instructions further executable by the at least one processor to cause the system to:

track the location of the wireless device over a time interval.

15. The system of claim 14, the program instructions further executable by the at least one processor to cause the system to:

determine, based on the tracked location of the wireless device, whether the wireless device moves out of a specified geographic area during the tracked time interval.

16. The system of claim 14, the program instructions further executable by the at least one processor to cause the system to:

determine, based on the tracked location of the wireless device, whether the wireless device moves into a specified geographic area during the tracked time interval.

17. The system of claim 15, the program instructions further executable by the at least one processor to cause the system to:

generate an alert, when the wireless device moves out of the specified geographic area during the tracked time interval.

18. The system of claim 13, the program instructions further executable by the at least one processor to cause the system to:

display the mapped street address on a graphical user interface.

19. A computer-readable storage device having program instructions stored thereon that, upon execution by a one or more processors, cause the one or more processors to:

receive a search request for a location of a wireless device, the search request received from a requesting party and the wireless device identified by a unique identifier;

determine when the search request is authorized by a search warrant;

when no search warrant has been provided, receive user input specifying an exigent circumstance basis for a warrantless search;

provide a notification message to at least one notification party, wherein the notification message comprises information describing the warrantless search, and further comprises the exigent circumstances specified by the user input;

determine a service provider that provides wireless service to the wireless device, wherein the service provider is determined based on the unique identifier that identifies the wireless device; obtain the location of the wireless device from the service provider; and when authorized by the notification party, provide the location of the wireless device to the requesting party.

20. The computer-readable storage device of claim 19, wherein the exigent circumstances comprise at least one of: a missing person, an escapee, and a public threat.

* * * * *